US012789806B2

(12) United States Patent
Komori

(10) Patent No.: US 12,789,806 B2
(45) Date of Patent: Nov. 10, 2026

(54) VEHICLE CONTROL DEVICE

(71) Applicant: TOYOTA JIDOSHA KABUSHIKI KAISHA, Toyota (JP)

(72) Inventor: Terumoto Komori, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 18/965,189

(22) Filed: Dec. 2, 2024

(65) Prior Publication Data

US 2025/0304066 A1 Oct. 2, 2025

(30) Foreign Application Priority Data

Mar. 27, 2024 (JP) ................................. 2024-051093

(51) Int. Cl.
*B60W 30/16* (2020.01)

(52) U.S. Cl.
CPC ......... *B60W 30/16* (2013.01); *B60W 2552/10* (2020.02); *B60W 2554/4041* (2020.02); *B60W 2554/4042* (2020.02); *B60W 2720/10* (2013.01); *B60W 2754/30* (2020.02)

(58) Field of Classification Search
None
See application file for complete search history.

(56) References Cited

U.S. PATENT DOCUMENTS

2021/0009127 A1 1/2021 Horiba et al.

FOREIGN PATENT DOCUMENTS

| | | | | |
|---|---|---|---|---|
| JP | H09-277887 | A | | 10/1997 |
| JP | 2003025868 | A | * | 1/2003 |
| JP | 2007-253723 | A | | 10/2007 |
| JP | 2017-030435 | A | | 2/2017 |
| JP | 6268581 | B2 | | 1/2018 |
| JP | 2021-014175 | A | | 2/2021 |

* cited by examiner

*Primary Examiner* — Hongye Liang
(74) *Attorney, Agent, or Firm* — Oliff PLC

(57) ABSTRACT

A vehicle control device has a processor configured to determine whether a representative speed of another vehicle traveling in an adjacent lane adjacent to a traveling lane in which a host vehicle is traveling is faster than a speed of the host vehicle, and set a target inter-vehicle distance between the host vehicle and a front vehicle in front of the host vehicle to be shorter than when the representative speed is equal to or less than the speed of the host vehicle, when it has been determined that the representative speed is faster than the speed of the host vehicle.

5 Claims, 6 Drawing Sheets

VEHICLE CONTROL DEVICE

FIELD

The present disclosure relates to a vehicle control device.

BACKGROUND

A vehicle control device is known that controls the host vehicle to maintain a target inter-vehicle distance between the host vehicle and a front vehicle.

The vehicle control device controls the speed of the host vehicle to maintain a safe distance between the host vehicle and another vehicle traveling in a lane adjacent to a traveling lane in which the host vehicle is traveling, by determining the possibility of another vehicle cutting in front of the host vehicle (see, for example, Japanese Unexamined Patent Publication No. 2007-253723).

SUMMARY

However, in a situation where the flow of traffic in the adjacent lane is faster than the speed of the host vehicle, another vehicle traveling in the adjacent lane may suddenly cut in front of the host vehicle at a high speed while the vehicle control device is controlling the host vehicle to maintain a target inter-vehicle distance between the host vehicle and a front vehicle.

In such a case, it is difficult for the vehicle control device to control the host vehicle to maintain a safe distance between the host vehicle and another vehicle.

Therefore, the present disclosure aims to provide a vehicle control device that sets a target inter-vehicle distance between the host vehicle and a front vehicle to prevent another vehicle traveling in the adjacent lane from suddenly moving in front of the host vehicle, in a situation where the flow of the traffic in the adjacent lane is faster than the speed of the host vehicle.

(1) According to one embodiment, a vehicle control device is provided. This vehicle control device has a processor configured to determine whether a representative speed of another vehicle traveling in an adjacent lane adjacent to a traveling lane in which a host vehicle is traveling is faster than a speed of the host vehicle, and set a target inter-vehicle distance between the host vehicle and a front vehicle in front of the host vehicle to be shorter than when the representative speed is equal to or less than the speed of the host vehicle, when it has been determined that the representative speed is faster than the speed of the host vehicle.

(2) In the vehicle control device of embodiment (1), it is preferable that the processor is further configured to set the target inter-vehicle distance so that the greater a difference between the representative speed and the speed of the host vehicle, the shorter the target inter-vehicle distance compared to when the representative speed is equal to or less than the speed of the host vehicle, when it has been determined that the representative speed is faster than the speed of the host vehicle.

(3) In the vehicle control device of the embodiment (1), it is preferable that the processor is further configured to set the target inter-vehicle distance so that the longer an average inter-vehicle distance of other vehicles in the adjacent lane, the shorter the target inter-vehicle distance compared to when the representative speed is equal to or less than the speed of the host vehicle, when it has been determined that the representative speed is faster than the speed of the host vehicle.

(4) In the vehicle control device of the embodiments (1) to (3), it is preferable that the processor is further configured to determine whether the representative speed of another vehicle traveling in the adjacent lane adjacent to the traveling lane in which the host vehicle is traveling is slower than the speed of the host vehicle, and decide to control the host vehicle so that a time required for the distance between the host vehicle and the front vehicle to become the target inter-vehicle distance is longer than when it has been determined that the representative speed is not slower than the speed of the host vehicle, when it has been determined that the representative speed is slower than the speed of the host vehicle and a distance between the host vehicle and the front vehicle is greater than the target inter-vehicle distance.

(5) In the vehicle control device of the embodiment (4), it is preferable that the processor is further configured to decide to control the host vehicle to decrease the speed of the host vehicle at a first deceleration rate until the speed of the host vehicle coincides with the representative speed, and then to decrease the speed of the host vehicle at a second deceleration rate less than the first deceleration rate, so that the distance between the host vehicle and the front vehicle becomes the target inter-vehicle distance, when it has been determined that the representative speed is slower than the speed of the host vehicle and a distance between the host vehicle and the front vehicle is longer than the target inter-vehicle distance.

(6) In the vehicle control device of the embodiment (4), it is preferable that the processor is further configured to decide to control the host vehicle to decrease the speed of the host vehicle at a third deceleration rate and then to decrease the speed of the host vehicle at a fourth deceleration rate less than the third deceleration rate, so that the distance between the host vehicle and the front vehicle becomes the target inter-vehicle distance, when it has been determined that the representative speed is slower than the speed of the host vehicle and a distance between the host vehicle and the front vehicle is longer than the target inter-vehicle distance, wherein the shorter an average inter-vehicle distance of other vehicles in the adjacent lane, the greater the third deceleration rate.

The vehicle control device according to the resent disclosure sets the target inter-vehicle distance to be shorter than when the representative speed is equal to or less than the speed of the host vehicle, when the representative speed of another vehicle traveling in the adjacent lane is faster than the speed of the host vehicle, thereby preventing another vehicle from moving in front of the host vehicle.

The object and advantages of the invention will be realized and attained by means of the elements and combinations particularly specified in the claims. It is to be understood that both the foregoing general description and the following detailed description are exemplary and explanatory and are not restrictive of the invention, as claimed.

DESCRIPTION OF EMBODIMENTS

Figure 1:
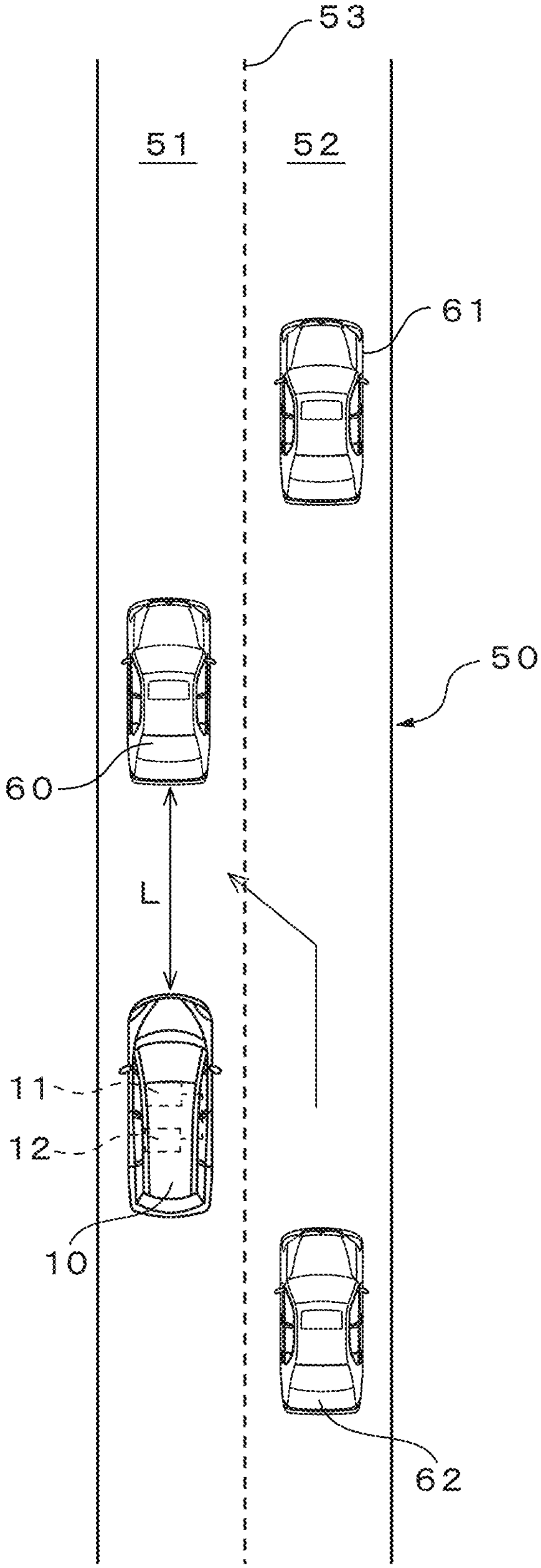
FIG. 1 is a general schematic drawing of an operation of an automatic control device in the first embodiment.

FIG. 1 is a general schematic drawing of the operation of the automatic control device 12 in the first embodiment. A vehicle 10 has the automatic control device 12 and an object detecting device 11. The automatic control device 12 has an autonomous driving mode (for example, driving modes from levels 3 to 5) in which the automatic control device 12 primarily operates the vehicle 10, and a manual driving mode (for example, driving modes from levels 0 to 2) in which a driver primarily operates the vehicle 10. The automatic control device 12 is an example of a vehicle control device. The vehicle 10 may be an autonomous driving vehicle.

The vehicle 10 is traveling on a road 50. The road 50 has two lanes 51 and 52. The vehicle 10 is traveling in the lane 51. The Lane 51 and the lane 52 are divided by a lane marking line 53.

A vehicle 60 is traveling in front of the vehicle 10. The automatic control device 12 controls the vehicle 10 to maintain a target inter-vehicle distance L between the vehicle 10 and the vehicle 60.

The automatic control device 12 sets the target inter-vehicle distance L based on the speed of the vehicle 10. For example, the faster the speed of the vehicle 10, the longer the target inter-vehicle distance L is set. Also, the target inter-vehicle distance L is set to be about a length of one vehicle when the vehicle 10 is stopped.

Two vehicles 61 and 62 are traveling in the lane 52 adjacent to the lane 51. The automatic control device 12 acquires information about the vehicles 61 and 62 traveling in the lane 52 based on the object detection information output by the object detecting device 11.

The automatic control device 12 determines whether a representative speed of other vehicles traveling in the lane 52 is faster than the speed of the vehicle 10 based on the object detection information. The most recent average speed may be used as the speed of the vehicle 10. Also, a value within a predetermined range including the most recent average speed may be used as the speed of the vehicle 10.

The automatic control device 12 may determine that the representative speed is faster than the speed of the vehicle 10 when a ratio of other vehicles that are detected within a predetermined reference time and faster than the vehicle 10 is more than a reference ratio.

The automatic control device 12 sets the target inter-vehicle distance L between the vehicle 10 and the vehicle 60 shorter than when the representative speed is equal to or less than 20) the speed of the vehicle 10, when the representative speed is faster than the speed of the vehicle 10. The automatic control device 12 controls the vehicle 10 to maintain the target inter-vehicle distance L between the vehicle 10 and the vehicle 60.

For example, in the example shown in FIG. 1, if the speed of the vehicle 62 traveling in the lane 52 is faster than the speed of the vehicle 10, the vehicle 62 may suddenly cut in front of the vehicle 10 at a high speed.

In the autonomous driving mode, the automatic control device 12 may have difficulty controlling the vehicle 10 so that a safe distance is maintained between the vehicle 62 and the vehicle 10. The automatic control device 12 requests a transfer of control of the vehicle 10 from the automatic control device 12 to the driver, resulting in a situation where the driver must operate the vehicle 10.

Therefore, when the representative speed is faster than the speed of the vehicle 10, the automatic control device 12 prevents the vehicle 62 from moving in front of the vehicle 10 by setting the target inter-vehicle distance L shorter than when the representative speed is equal to or less than the speed of the vehicle 10.

As described above, the automatic control device 12 of the present embodiment prevents another vehicle from moving in front of the vehicle 10 by setting the target inter-vehicle distance to be shorter than when the representative speed is equal to or less than the speed of the host vehicle, when the representative speed of another vehicle traveling in the adjacent lane is faster than the speed of the host vehicle.

Figure 2:
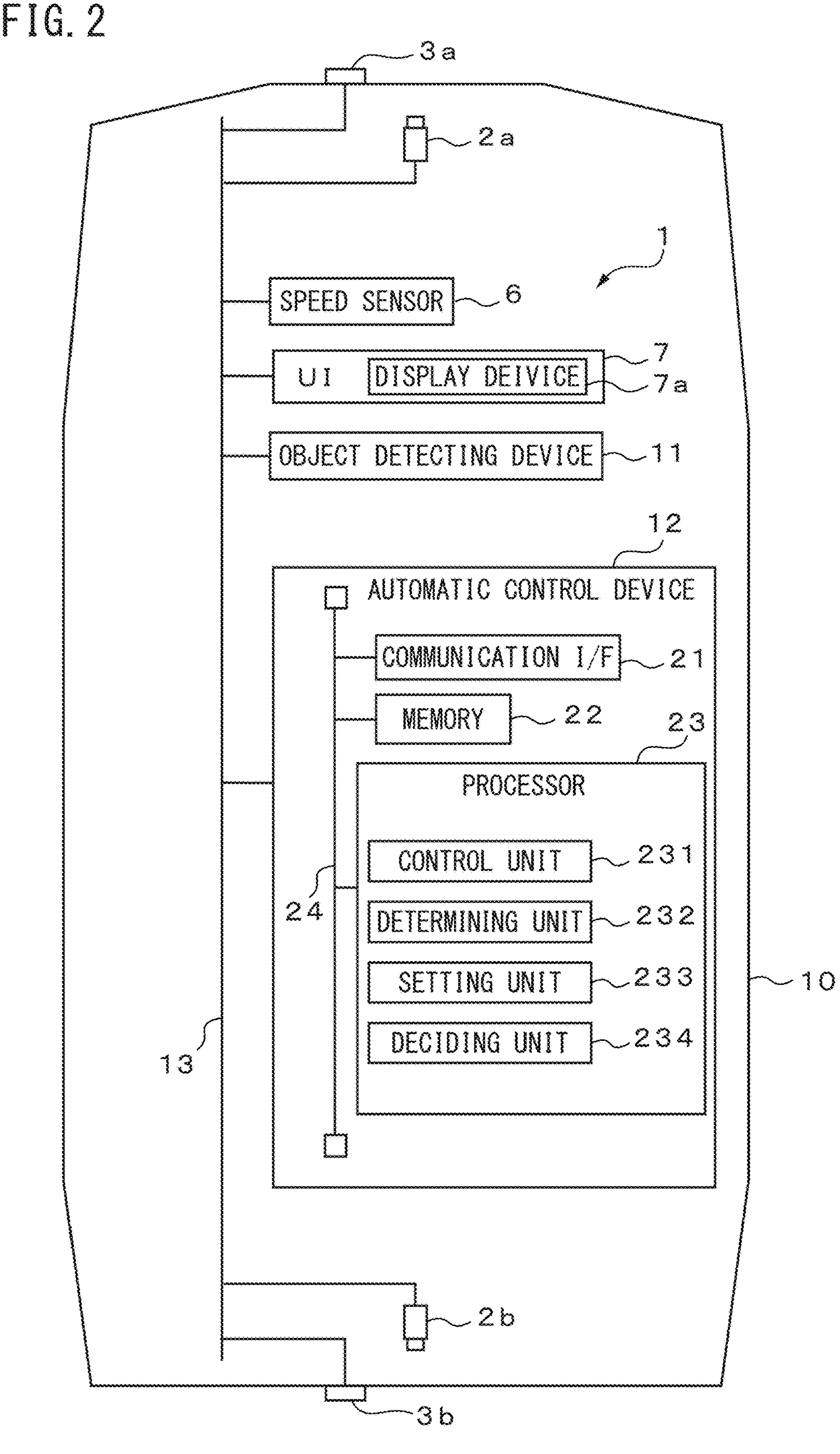
FIG. 2 is a hardware diagram of a vehicle in which the automatic control device of the first embodiment is mounted.

FIG. 2 is a hardware diagram of the vehicle 10 in which the automatic control device 12 of the first embodiment is mounted. The vehicle 10 has a front camera 2*a*, a rear camera 2*b*, LiDAR sensors 3*a*, 3*b*, a speed sensor 6, a user interface (UI) 7, the object detecting device 11, and the automatic control device 12, etc. The vehicle 10 may further has a distance measuring sensor such as a millimeter-wave radar sensor.

The front camera 2*a*, the rear camera 2*b*, the LiDAR sensors 3*a*, 3*b*, the speed sensor 6, the user interface (UI) 7, the object detecting device 11, and the automatic control device 12 are connected in a communicable manner via an in-vehicle network 13 conforming to the Controller Area Network standard.

The front camera 2*a* and the rear camera 2*b* are examples of image capturing units provided in the vehicle 10. The front camera 2*a* is mounted on the vehicle 10 to face the front of the vehicle. The rear camera 2*b* is mounted on the vehicle 10 to face the rear of the vehicle.

The front camera 2*a* and the rear camera 2*b* capture camera images representing the environment within a predetermined field of view in front of and behind the vehicle 10 at camera image capturing times set at a predetermined cycle, for example. The camera images may represent the road within a predetermined area in front of and behind the vehicle 10, including road features such as lane marking lines on the road surface.

The front camera 2*a* and the rear camera 2*b* have two-dimensional detectors composed of arrays of photoelectric conversion elements sensitive to visible light, such as CCD or C-MOS. Furthermore, the front camera 2*a* and the rear camera 2*b* have imaging optical systems that form images of the areas to be captured on the two-dimensional detectors. The fields of view of the front camera 2*a* and the rear camera 2*b* are examples of predetermined area around the vehicle 10.

Each time the front camera 2*a* and the rear camera 2*b* capture camera images, they output the camera images and the camera image capturing times to the object detecting device 11 and the automatic control device 12, etc., via the in-vehicle network 13. The camera images are used by the object detecting device 11 for processing of detecting objects and road features around the vehicle 10.

The LiDAR sensors 3*a*, 3*b* emit lasers to scan a predetermined field of view in front of and behind the vehicle 10 at reflected wave information acquisition times set at a predetermined cycle. Then, the LiDAR sensors 3*a*, 3*b* receive the reflected waves that have been reflected from the reflectors. The time required for the reflected wave to return contains information for the distance between the vehicle 10 and objects located in the direction in which the laser has been emitted. The LiDAR sensors 3*a*, 3*b* output the reflected wave information together with the reflected wave information acquisition time at which the laser was emitted, to the automatic control device 12 via the in-vehicle network 13. The reflected wave information includes the laser emission direction and the time required for the reflected wave to return. The reflected wave information is used by the object detecting device 11 to detect objects around the vehicle 10.

The speed sensor 6 detects speed information of the vehicle 10 and outputs the speed information and the time at which the speed information was obtained to the object detecting device 11 and the automatic control device 12, etc., via the in-vehicle network 13. The speed sensor 6, for example, is attached to the axle (not shown), detects the number of rotations of the axle, and outputs a pulse signal proportional to the number of rotations.

The UI 7 is an example of a notification unit. The UI 7, controlled by the automatic control device 12, notifies the driver of information relating to the vehicle 10. The UI 7 has a display device 7*a*, such as an LCD display or a touch panel, for displaying the information. In addition, the UI 7 may have an audible output device (not shown) for notifying the driver of information. In addition, the UI 7 has, for example, a touch panel or control buttons as input devices for inputting operational information from the driver to the vehicle 10. The UI 7 outputs the input information to the automatic control device 12, etc., via the in-vehicle network 13.

The object detecting device 11 detects road features such as lane markings and objects around the vehicle 10, based on camera images. The object detecting device 11 has a classifier that classifies objects, structures, and road features represented in the images by inputting camera images, for example. As a classifier, for example, a pre-trained deep neural network (DNN) can be used to classify objects, structures, and road features represented in the input images. The object detecting device 11 may use a classifier other than the DNN.

The object detecting device 11 may also detect objects around the vehicle 10 based on reflected wave information. The object detecting device 11 may also determine the orientation of an object with respect to the vehicle 10 based on the location of the object in the camera image, and may determine the distance between the object and the vehicle 10, based on the orientation and on the reflected wave information. The position of an object represents a position that represents the object (for example, the center of gravity). The object detecting device 11 estimates the location of the object represented in a vehicle coordinate system, for example, based on the current location of the vehicle 10, and the distance of the object from the vehicle 10 and its orientation. The object detecting device 11 identifies a lane in which an object is traveling, based on the lane marking lines and the object position. For example, the object detecting device 11 determines that an object is traveling in the lane identified by two mutually adjacent lane marking lines flanking the horizontal center position of the object. The object detecting device 11 may also track an object to be detected from an updated camera image, by matching objects detected in the updated image with objects detected in previous images, according to a tracking process based on optical flow. The tracked object is assigned an object identification number. The object detecting device 11 may also calculate the trajectory of an object being tracked, based on the location of the object in an image updated from a previous image. The object detecting device 11 can estimate the speed of an object with respect to the vehicle 10, based on changes in the location of the object over the course of time. The object detecting device 11 can also estimate the acceleration of an object based on changes in the speed of the object over the course of time. It should be noted that the technology described in Japanese Unexamined Patent Application Publication No. 2024-11893 may be used as a method for determining the lane in which another vehicle is traveling.

The object detecting device 11 notifies the automatic control device 12, etc., of object detection information containing information representing the objects, and road feature information representing the road features. The object detection information includes information indicating the type of detected object, the position, the speed, the acceleration, and the traveling lane. For tracked objects, the object detection information includes an object identification number.

The automatic control device 12 carries out control processing, determining processing, setting processing, and decision processing. For that purpose, the automatic control device 12 has a communication interface (IF) 21, a memory 22, and a processor 23. The communication interface 21, memory 22, and processor 23 are connected via signal wires 24. The communication interface 21 has interface circuitry for connecting the automatic control device 12 to the in-vehicle network 13.

The memory 22 is an example of a storage unit, and the memory 22 has a volatile semiconductor memory and a non-volatile semiconductor memory, for example. The memory 22 stores an application computer program and various data to be used for information processing carried out by the processor 23.

All or some of the functions of the automatic control device 12 are carried out by functional modules driven by a computer program operating on the processor 23, for example. The processor 23 has a control unit 231, a determining unit 232, a setting unit 233 and a deciding unit 234. Alternatively, the functional module of the processor 23 may be a specialized computing circuit in the processor 23. The processor 23 has one or more CPUs (Central Processing Units) and their peripheral circuits. The processor 23 may also have other computing circuits such as a logical operation unit, numerical calculation unit or graphics processing unit.

The object detecting device 11 and the automatic control device 12 are, for example, electronic control units (Electronic Control Units: ECUs). In FIG. 2, the object detecting device 11 and the automatic control device 12 are illustrated as separate devices (for example, ECUs), but these devices may be configured as a single device. The processor 23 also includes the control unit 231, the determining unit 232, the setting unit 233 and the deciding unit 234, but the control unit 231 may be included in a processor other than a processor including the determining unit 232, the setting unit 233 and the deciding unit 234.

The control unit 231 controls the operation of the vehicle 10. The control unit 231 has an autonomous driving mode for driving the vehicle 10 automatically, and a manual driving mode for controlling the operation of the vehicle 10 based on the driver's operation. In the autonomous driving mode, the control unit 231 primarily drives the vehicle 10. In the autonomous driving mode, the control unit 231 controls the operation such as steering, driving, and braking based on the current position of the vehicle 10, map information, camera images, and reflected wave information, etc.

Also, in the manual driving mode, the control unit 231 controls the operation of the vehicle 10 such as steering, driving, and braking based on the driver's operation. In the manual driving mode, the driver primarily drives the vehicle 10.

If the control unit 231 determines that the vehicle 10 cannot be safely operated in the automatic control mode, the control unit 231 notifies the driver via the UI 7 of a control transition request to transfer the driving responsibility from the control unit 231 to the driver. In response to the control transition request, the driver starts operating the vehicle 10 in the manual driving mode.

The control unit 231 calculates a distance between the vehicles traveling in the adjacent lane adjacent to the traveling lane in which the vehicle 10 is traveling based on the object detection information. For example, the control unit 231 places a vehicle model with a representative vehicle length in a position (e.g. center of gravity) that is representative of each of other vehicles traveling in the adjacent lane. The vehicle model is placed so that its longitudinal center coincides with the position of each of other vehicles. The control unit 231 calculates the average distance between the adjacent vehicle models as the average distance between the vehicles traveling in the adjacent lane.

Figure 3:
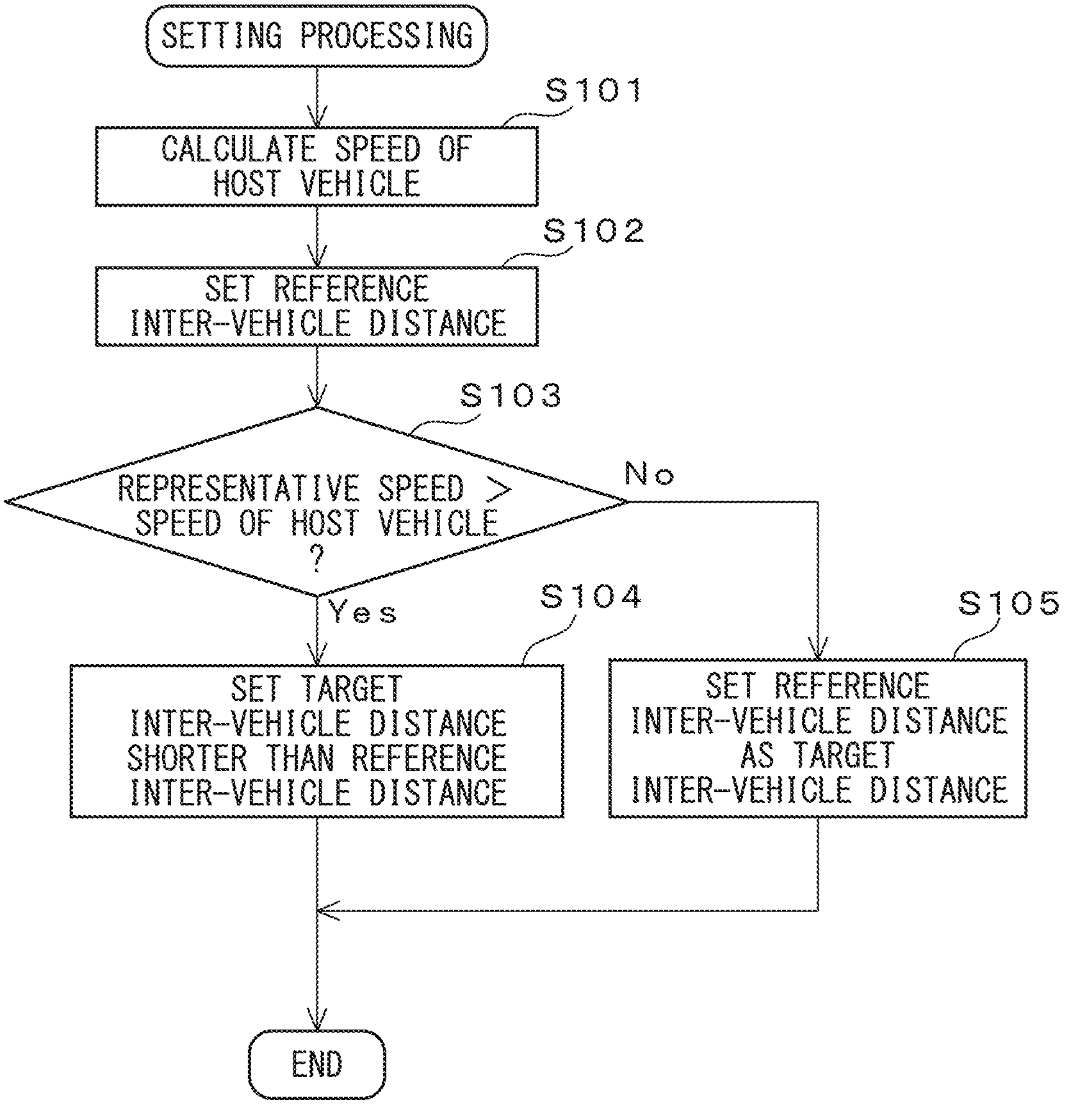
FIG. 3 is an example of an operation flow chart for setting processing by the automatic control device of the first embodiment.

FIG. 3 is an example of an operation flow chart for setting processing by the automatic control device 12 of the first embodiment. The automatic control device 12 carries out the setting processing at a setting time having a predetermined cycle, in accordance with the operation flowchart shown in FIG. 3.

First, the setting unit 233 calculates the speed of the vehicle 10 based on the speed information (step S101). The setting unit 233 may calculate the recent average speed of the vehicle 10 (for example, over the last 5 to 10 seconds) based on the speed information. Also, a predetermined range of value including the recent average speed may be used as the speed of the vehicle 10. The speed of the vehicle 10 may be set within a range from the average speed +10 km/h to the average speed −10 km/h.

Next, the setting unit 233 sets a reference inter-vehicle distance based on the speed of the vehicle 10 (step S102). The setting unit 233 sets the reference inter-vehicle distance to be longer as the speed of the vehicle 10 increases. The reference inter-vehicle distance is set to be about the length of one vehicle when the vehicle 10 is stopped.

Next, the determining unit 232 determines whether the representative speed of another vehicle traveling in the lane adjacent to the traveling lane in which the vehicle 10 is traveling is faster than the speed of the vehicle 10 (step S103).

The determining unit 232 obtains the speed of other vehicles traveling in the adjacent lane based on the object detection information. The determining unit 232 determines that the representative speed is faster than the speed of the vehicle 10 when a ratio of other vehicles that are detected within a predetermined reference time and faster than the vehicle 10 is equal to or greater than a reference ratio. The reference time can be, for example, from 1 to 5 minutes. The reference ratio may be, for example, 50%.

If no other vehicles traveling in the adjacent lane are detected within the reference time, the determining unit 232 determines that the representative speed is not faster than the speed of the vehicle 10.

Furthermore, the determining unit 232 may make the determination based on the camera images obtained by the front camera 2*a*. When a number of vehicles appearing from the right edge of the camera image of the front camera 2*a*, moving to the left, and disappearing upward exceeds a reference number per unit time, the determining unit 232 determines that the representative speed of another vehicle traveling in the lane adjacent to the right of the traveling lane is faster than the speed of the vehicle 10. The unit time can be, for example, from 5 to 10 minutes. The reference number may be from 2 to 5. Similarly, the determining unit 232 determines whether the representative speed of the lane adjacent to the left of the traveling lane is faster than the speed of the vehicle 10.

The setting unit 233 sets a target inter-vehicle distance L between the vehicle 10 and a front vehicle in front of the vehicle 10 to be shorter than when the representative speed is equal to or less than the speed of the vehicle 10 (step S104), when it has been determined that the representative speed of another vehicle traveling in the adjacent lane is faster than the speed of the vehicle 10 (step S103—Yes). The target inter-vehicle distance L is set as the reference inter-vehicle distance, when the representative speed is equal to or less than the speed of the vehicle 10.

The setting unit 233 sets the target inter-vehicle distance L shorter than the reference inter-vehicle distance set in step S102. The setting unit 233 may set the target inter-vehicle distance L as the product of the reference inter-vehicle distance and a predetermined coefficient (a real number between 0.3 and 0.9). Furthermore, the setting unit 233 may set the target inter-vehicle distance L as the value obtained by subtracting a predetermined distance from the reference inter-vehicle distance.

It is preferable that the shortened target inter-vehicle distance L still provides a safe interval between the vehicle 10 and the front vehicle. For example, it is preferable that the target inter-vehicle distance L is greater than a minimum inter-vehicle distance determined according to the speed of the vehicle 10. For instance, if the target inter-vehicle distance L falls below the minimum inter-vehicle distance, the target inter-vehicle distance L may be set as the minimum inter-vehicle distance.

Additionally, the setting unit 233 may set the target inter-vehicle distance L so that the greater a difference between the representative speed and the speed of the vehicle 10, the shorter the target inter-vehicle distance L compared to when the representative speed is equal to or less than the speed of the vehicle 10. The smaller the relative speed between the representative speed and the speed of the vehicle 10, the smaller the speed difference between the vehicle 10 and another vehicle, thus the target inter-vehicle distance L is brought closer to the reference inter-vehicle distance. For example, the target inter-vehicle distance L may be set as a value obtained by subtracting the product of the difference between the representative speed and the speed of the vehicle 10 and a predetermined coefficient from the reference inter-vehicle distance.

Furthermore, the setting unit 233 may set the target inter-vehicle distance L so that the longer an average inter-vehicle distance of other vehicles in the adjacent lane, the shorter the target inter-vehicle distance L compared to when the representative speed is equal to or less than the speed of the vehicle 10. If the distance between the vehicles in the adjacent lane is short, it is not expected that another vehicle will cut in suddenly from the adjacent lane, thus the target inter-vehicle distance L is brought closer to the reference inter-vehicle distance. For example, the target inter-vehicle distance L may be set as a value obtained by subtracting the product of the average inter-vehicle distance and a predetermined coefficient from the reference inter-vehicle distance.

On the other hand, when the representative speed of another vehicle traveling in the adjacent lane is not faster than the speed of the vehicle 10 (step S103—No), the setting unit 233 sets the reference inter-vehicle distance as the target inter-vehicle distance L (step S105) and the series of processing steps is complete. In the absence of a front vehicle, the control unit 231 controls the vehicle 10 to travel at the set speed. The set speed is, for example, the speed limit of the road or a speed set by the driver.

The control unit 231 controls the vehicle 10 to maintain the target inter-vehicle distance L between the vehicle 10 and the vehicle 60. The control unit 231 controls the vehicle 10 so that the distance between the vehicle 10 and the vehicle 60 becomes the target inter-vehicle distance L within a predetermined reference time when the distance between the vehicle 10 and the vehicle 60 is greater than the target inter-vehicle distance L. The reference time may be changed according to the speed of the vehicle 10. For example, the faster the speed of the vehicle 10, the shorter the reference time.

If the target inter-vehicle distance L is set shorter than when the representative speed is equal to or less than the speed of the vehicle 10, the control unit 231 may use UI 7 to notify the driver that the target inter-vehicle distance L has been set shorter to prevent another vehicle from cutting in. Additionally, the control unit 231 may use UI 7 to notify the driver of a hands-on request to hold the steering wheel. Thus, if a control transition request is notified due to another vehicle cutting in front of the vehicle 10, the driver can quickly start the manual driving.

In the example shown in FIG. 1, if the speed of the vehicle 62 traveling in the lane 52 is faster than the speed of the vehicle 10, the vehicle 62 may suddenly cut in front of the vehicle 10 at a high speed. Even in the autonomous driving mode, if both the speed of the vehicle 10 and the representative speed are slow, the control unit 231 may be able to control the vehicle 10 to maintain a safe distance between the vehicle 62 and the vehicle 10.

However, if both the speed of the vehicle 10 and the representative speed are relatively fast, the control unit 231 may have difficulty controlling the vehicle 10 to maintain the safe distance between the vehicle 62 and the vehicle 10.

If the control unit 231 determines that it is difficult to control the vehicle 10 to maintain the safe distance between the vehicle 62 and the vehicle 10, the control unit 231 notifies the driver of the control transition request through the UI 7. The driver may be faced with a situation where the driver must drive the vehicle 10 in response to the control transition request.

Therefore, when the representative speed is faster than the speed of the vehicle 10, the setting unit 233 prevents the vehicle 62 from moving in front of the vehicle 10 by setting the target inter-vehicle distance L shorter than when the representative speed is equal to or less than the speed of the vehicle 10. When the inter-vehicle distance between the vehicle 10 and the vehicle 60 is short, it becomes difficult for the vehicle 62 to move between the vehicle 10 and the vehicle 60.

As described in detail above, the automatic control device of the present embodiment prevents another vehicle from moving in front of the vehicle 10 by setting the target inter-vehicle distance L shorter than when the representative speed of another vehicle traveling in the adjacent lane is faster than the speed of the vehicle 10.

Next, the second embodiment of the automatic control device will be described below with reference to FIGS. 4 to 6. For the second embodiment, the description of the first embodiment explained above is appropriately applied where indicated.

Figure 4:
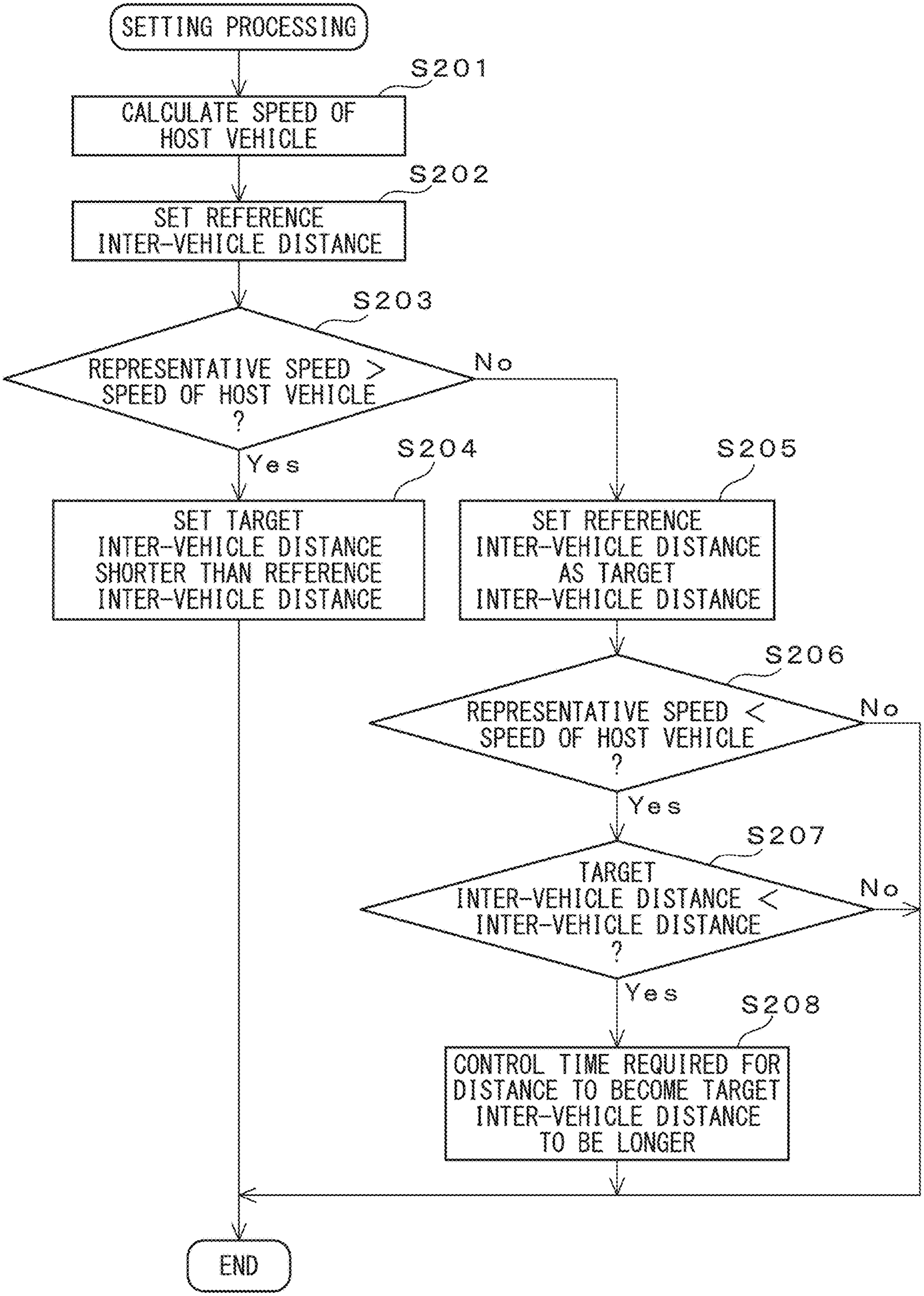
FIG. 4 is an example of an operation flow chart for setting processing by the automatic control device of the second embodiment.

FIG. 4 is an example of an operation flow chart for setting processing by the automatic control device 12 of the second embodiment. In the present embodiment, the addition of steps S206 to S208 differs from the first embodiment described above. The processing from steps S201 to S205 is similar to the steps from S101 to S105 of the first embodiment described above.

After the reference inter-vehicle distance is set as the target inter-vehicle distance L (step S205), the determining unit 232 determines whether the representative speed of another vehicle traveling in the lane adjacent to the traveling lane in which the vehicle 10 is traveling is slower than the speed of the vehicle 10 (step S206).

The determining unit 232 obtains the speed of other vehicles traveling in the adjacent lane based on the object detection information. The determining unit 232 determines that the representative speed is slower than the speed of the vehicle 10 when a ratio of other vehicles that are detected within a predetermined reference time and slower than the vehicle 10 is equal to or greater than a reference ratio. The reference time can be, for example, from 1 to 5 minutes. The reference ratio may be, for example, 50%.

If no other vehicles traveling in the adjacent lane are detected within the reference time, the determining unit 232 determines that the representative speed is not slower than the speed of the vehicle 10.

Furthermore, the determining unit 232 may make the determination based on the camera images obtained by the front camera 2*a*. When a number of vehicles appearing from the top of the camera image of the front camera 2*a*, moving to the right, and disappearing at the right edge exceeds a reference number per unit time, the determining unit 232 determines that the representative speed of another vehicle traveling in the lane adjacent to the right of the traveling lane is slower than the speed of the vehicle 10. The unit time can be, for example, from 5 to 10 minutes. The reference number may be from 2 to 5.

Similarly, the determining unit 232 determines whether the representative speed of the lane adjacent to the left of the traveling lane is slower than the speed of the vehicle 10.

If the representative speed of another vehicle traveling in the adjacent lane is slower than the speed of the vehicle 10 (step S206—Yes), the determining unit 232 determines whether the distance between the vehicle 10 and the front vehicle in front of the vehicle 10 is greater than the target inter-vehicle distance L (step S207).

The determining unit 232 obtains the distance between the vehicle 10 and the front vehicle based on the object detection information. Furthermore, the determining unit 232 determines that the distance is not greater than the target inter-vehicle distance L when there is no front vehicle.

When the distance is greater than the target inter-vehicle distance L (step S207—Yes), the deciding unit 234 decides to control the vehicle 10 so that a time required for the distance between the vehicle 10 and the front vehicle to become the target inter-vehicle distance L is longer than when it has been determined that the representative speed is not slower than the speed of the vehicle 10 (step S208).

The case where the representative speed is not slower than the speed of the vehicle 10 includes both the case where the representative speed is faster than the speed of the vehicle 10 and the case where the representative speed is the same as the speed of the vehicle 10. When the representative speed is not slower than the speed of the vehicle 10, the control unit 231 controls the vehicle 10 so that the distance between the vehicle 10 and the front vehicle becomes the target inter-vehicle distance L at a reference time.

The deciding unit 234 decides to control the vehicle 10 so that a time required for the distance between the vehicle 10 and the front vehicle to become the target inter-vehicle distance L is longer than the reference time.

Figure 5:
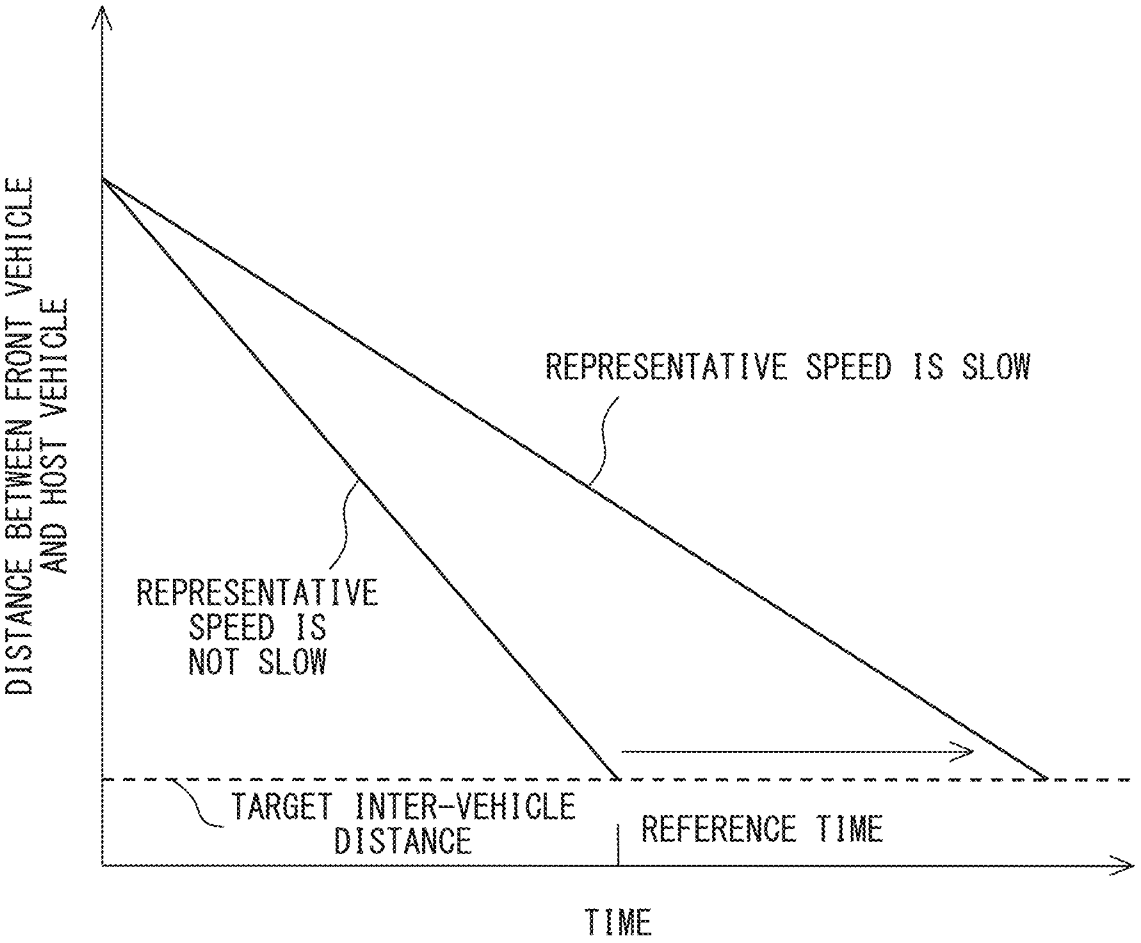
FIG. 5 is a diagram (part 1) illustrating the setting processing by the automatic control device of the second embodiment.
Figure 6:
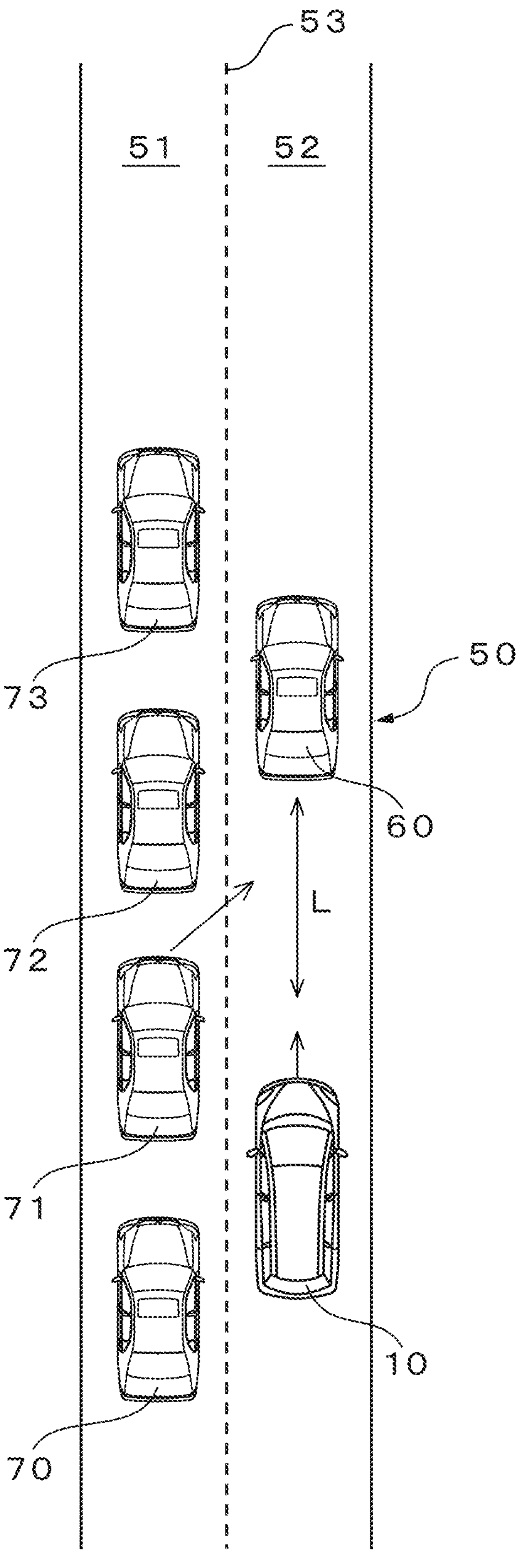
FIG. 6 is a diagram (part 2) illustrating the setting processing by the automatic control device of the second embodiment.

FIGS. 5 and 6 are diagrams illustrating the setting processing by the automatic control device 12 of the second embodiment. The vertical axis of FIG. 5 indicates the distance between the front vehicle and the vehicle 10, and the horizontal axis indicates the time. When the representative speed is not slower than the speed of the vehicle 10, the time required for the distance between the front vehicle and the vehicle 10 to become the target inter-vehicle distance L is the reference time.

On the other hand, when the representative speed is slower than the speed of the vehicle 10, the time required for the distance between the front vehicle and the vehicle 10 to become the target inter-vehicle distance L is longer than when the representative speed is not slower than the speed of the vehicle 10.

For example, the deciding unit 234 may decide to control the vehicle 10 to decrease the speed of the vehicle 10 at a first deceleration rate until the speed of the vehicle 10 coincides with the representative speed, and then to decrease the speed of the vehicle 10 at a second deceleration rate less than the first deceleration rate, so that the distance between the vehicle 10 and the front vehicle becomes the target inter-vehicle distance L.

The control unit 231 decreases the speed of the vehicle 10 in a short time until the relative speed with the representative speed of the adjacent lane becomes zero, and then gradually decreases the speed of the vehicle 10 until the target inter-vehicle distance L is reached. As a result, the control unit 231 has time to react to another vehicle when another vehicle cuts in front of the vehicle 10 because the speed of the vehicle 10 becomes the same as that of another vehicle in the adjacent lane.

Furthermore, the deciding unit 234 may decide to control the vehicle 10 to decrease the speed of the vehicle 10 at a third deceleration rate and then to decrease the speed of the vehicle 10 at a fourth deceleration rate less than the third deceleration rate, so that the distance between the vehicle 10 and the front vehicle becomes the target inter-vehicle distance L. Here, it is preferable for the deciding unit 234 to control the vehicle 10 so that the shorter an average inter-vehicle distance of other vehicles in the adjacent lane, the greater the third deceleration rate.

The control unit 231 increases the initial amount of deceleration as the average inter-vehicle distance of other vehicles in the adjacent lane decreases. As the level of congestion in the adjacent lane increases, the likelihood of another vehicle cutting in increases, so the control unit 231 quickly decreases the speed of the vehicle 10 and then allows the vehicle 10 to travel slowly. This allows the control unit 231 to have time to react to another vehicle when another vehicle cuts in front of the vehicle 10.

As shown in FIG. 6, a case where the representative speed is slower than the speed of the vehicle 10 includes the adjacent lane being congested. In FIG. 6, the vehicle 10 is traveling in the lane 52 of the road 50. The vehicle 60 is traveling in front of the vehicle 10. The vehicles 70 to 73 are traveling in the lane 51 and the lane 51 is congested.

By extending the time required for the distance between the vehicle 10 and the front vehicle to become the target inter-vehicle distance L, the control unit 231 can control the vehicle 10 to maintain a safe distance between the vehicle 10 and another vehicle when the vehicle 71 moves out of the lane 51 in front of the vehicle 10. This avoids the need to notify the driver of a control transition request.

As described in detail above, the automatic control device of the present embodiment controls the host vehicle so that a time required for the distance between the host vehicle and the front vehicle to become the target inter-vehicle distance is longer than when it has been determined that the representative speed is not slower than the speed of the host vehicle. Thus, the automatic control device of the present embodiment can control the host vehicle in response to another vehicle moving in front of the host vehicle. Furthermore, the automatic control device of the present embodiment achieves the same effects as the first embodiment described above.

In this disclosure, the vehicle control device of the embodiments described above can be appropriately modified without departing from the spirit of this disclosure. Furthermore, the technical scope of this disclosure is not limited to those embodiments, but extends to the inventions described in the claims and their equivalents.

For example, there may be adjacent lanes on either side of the traveling lane in which the host vehicle is traveling, where the representative speed of another vehicle traveling in one of the adjacent lanes is faster than the speed of the host vehicle, and the representative speed of another vehicle traveling in the other adjacent lane is slower than the speed of the host vehicle. In this case, the vehicle control device may operate the host vehicle to set the target inter-vehicle distance between the host vehicle and the front vehicle to be shorter than when the representative speed is equal to or less than the speed of the host vehicle, and then operate the host vehicle so that the target inter-vehicle distance is longer than when the representative speed is not slower than the speed of the host vehicle. Alternatively, the vehicle control device may operate the vehicle so that the target inter-vehicle distance is longer than when the representative speed is not slower than the speed of the host vehicle until the distance between the host vehicle and the front vehicle approaches to the target inter-vehicle distance, and then operate the host vehicle so that the target inter-vehicle distance is shorter than when the representative speed is equal to or less than the speed of the host vehicle.

The invention claimed is:

1. An autonomous vehicle control device provided in a host vehicle, the control device comprising:

a processor configured to:

determine whether a representative speed of another vehicle traveling in an adjacent lane adjacent to a traveling lane in which the host vehicle is traveling is faster than a speed of the host vehicle;

when it has been determined that the representative speed of the other vehicle is faster than the speed of the host vehicle, set a target inter-vehicle distance between the host vehicle and a front vehicle in front of the host vehicle in the traveling lane to be shorter than the target inter-vehicle distance when the representative speed of the other vehicle is equal to or less than the speed of the host vehicle; and control the host vehicle to maintain the set target inter-vehicle distance between the host vehicle and the front vehicle.

2. The autonomous vehicle control device according to claim 1, wherein when it has been determined that the representative speed of the other vehicle is faster than the speed of the host vehicle, the processor is further configured to set the target inter-vehicle distance so that, the greater a difference between the representative speed and the speed of the host vehicle, the shorter the target inter-vehicle distance.

3. The autonomous vehicle control device according to claim 1, wherein when it has been determined that the representative speed of the other vehicle is faster than the speed of the host vehicle the processor is further configured to set the target inter-vehicle distance so that, the longer an average inter-vehicle distance of other vehicles in the adjacent lane, the shorter the target inter-vehicle distance.

4. The autonomous vehicle control device according to claim 1, wherein the processor is further configured to determine whether the representative speed of the other vehicle traveling in the adjacent lane is slower than the speed of the host vehicle, and when it has been determined that the representative speed of the other vehicle is slower than the speed of the host vehicle and a distance between the host vehicle and the front vehicle is greater than the target inter-vehicle distance, control the host vehicle so that a time required for the distance between the host vehicle and the front vehicle to become the target inter-vehicle distance is longer than when it has been determined that the representative speed of the other vehicle is not slower than the speed of the host vehicle.

5. The autonomous vehicle control device according to claim 4, wherein when it has been determined that the representative speed of the other vehicle is slower than the speed of the host vehicle and the distance between the host vehicle and the front vehicle is longer than the target inter-vehicle distance the processor is further configured to control the host vehicle (i) to decrease the speed of the host vehicle at a first deceleration rate until the speed of the host vehicle coincides with the representative speed and (ii) then to decrease the speed of the host vehicle at a second deceleration rate less than the first deceleration rate so that the distance between the host vehicle and the front vehicle becomes the target inter-vehicle distance.

* * * * *